(12) United States Patent
Hendri et al.

(10) Patent No.: US 10,585,966 B2
(45) Date of Patent: Mar. 10, 2020

(54) SYSTEMS AND METHODS FOR ACCESSING CONTENT

(71) Applicant: Facebook, Inc., Menlo Park, CA (US)

(72) Inventors: Fnu Hendri, New York, NY (US); Chi Wai Ng, Scarborough (CA); Ashoke K. Chakrabarti, Oakland, CA (US)

(73) Assignee: Facebook, Inc., Menlo Park, CA (US)

( * ) Notice: Subject to any disclaimer, the term of this patent is extended or adjusted under 35 U.S.C. 154(b) by 81 days.

(21) Appl. No.: 15/652,173

(22) Filed: Jul. 17, 2017

(65) Prior Publication Data

US 2018/0218086 A1 Aug. 2, 2018

Related U.S. Application Data

(60) Provisional application No. 62/453,456, filed on Feb. 1, 2017.

(51) Int. Cl.
*G06F 16/957* (2019.01)
*H04L 29/08* (2006.01)

(52) U.S. Cl.
CPC .......... *G06F 16/9574* (2019.01); *H04L 67/02* (2013.01); *H04L 67/327* (2013.01); *H04L 67/10* (2013.01); *H04L 67/2842* (2013.01)

(58) Field of Classification Search
CPC .......... G06F 17/30902; G06F 16/9574; H04L 67/02; H04L 67/10; H04L 67/327; H04L 67/2842
USPC ........................................................ 709/217
See application file for complete search history.

(56) References Cited

U.S. PATENT DOCUMENTS

| | | | |
|---|---|---|---|
| 9,648,125 B2 * | 5/2017 | Flack | H04N 21/23106 |
| 2008/0263103 A1 * | 10/2008 | McGregor | G06F 21/6218 |
| 2015/0207897 A1 * | 7/2015 | Flack | H04L 67/2842 709/213 |

\* cited by examiner

*Primary Examiner* — Kristie D Shingles
(74) *Attorney, Agent, or Firm* — Sheppard Mullin Richter & Hampton LLP

(57) ABSTRACT

Systems, methods, and non-transitory computer-readable media can determine a request for a page of content items to be obtained from a content provider, the request being associated with a cache key. A determination is made that access to the content provider is unavailable. A determination is made that a response corresponding to the page of content items is stored in a local data store based at least in part on the cache key, wherein the response was previously obtained from the content provider. The page of content items is presented through a display screen associated with a computing device.

17 Claims, 10 Drawing Sheets

500

```
┌─────────────────────────────────────────────────┐
│ Determine a request for a page of content items │
│ to be obtained from a content provider, the     │
│ request being associated with a cache key       │
│                      502                        │
└─────────────────────────────────────────────────┘
                        │
                        ▼
┌─────────────────────────────────────────────────┐
│ Determine that access to the content provider   │
│ is unavailable                                  │
│                      504                        │
└─────────────────────────────────────────────────┘
                        │
                        ▼
┌─────────────────────────────────────────────────┐
│ Determine that a response corresponding to the  │
│ page of content items is stored in a local data │
│ store based at least in part on the cache key,  │
│ wherein the response was previously obtained    │
│ from the content provider                       │
│                      506                        │
└─────────────────────────────────────────────────┘
                        │
                        ▼
┌─────────────────────────────────────────────────┐
│ Present the page of content items through a     │
│ display screen associated with the computing    │
│ device                                          │
│                      508                        │
└─────────────────────────────────────────────────┘
```

FIGURE 5

SYSTEMS AND METHODS FOR ACCESSING CONTENT

CROSS-REFERENCE TO RELATED APPLICATIONS

This application claims priority to U.S. Provisional Patent Application No. 62/453,456, filed on Feb. 1, 2017 and entitled "SYSTEMS AND METHODS FOR ACCESSING CONTENT", which is incorporated herein by reference.

FIELD OF THE INVENTION

The present technology relates to the field of content distribution. More particularly, the present technology relates to techniques for distributing content to users.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, users may post various content items to a social networking system. In general, content items posted by a first user can be included in the respective content feeds of other users of the social networking system, for example, that have "followed" the first user. By following (or subscribing to) the first user, some or all content that is produced, or posted, by the first user may be included in the respective content feeds of the following users. A user following the first user can simply unfollow the first user to prevent new content that is produced by the first user from being included in the following user's content feed.

SUMMARY

Various embodiments of the present disclosure can include systems, methods, and non-transitory computer readable media configured to determine a request for a page of content items to be obtained from a content provider. The request can be associated with a cache key. A determination can be made that access to the content provider is unavailable. A determination can be made that a response corresponding to the page of content items is stored in a local data store based at least in part on the cache key, the response having previously been obtained from the content provider. The page of content items can be presented through a display screen associated with a computing device.

In some embodiments, the response stored in the local data store is also associated with the cache key.

In some embodiments, the cache key references at least the page of content items and a corresponding content feed.

In some embodiments, the stored response includes a JavaScript Object Notation (JSON) document that identifies each content item included in the page.

In some embodiments, the response indicates a respective ranking for each content item in the page.

In some embodiments, the systems, methods, and non-transitory computer readable media are configured to determine a second request for a second page of content items to be obtained from the content provider, the request being associated with a second cache key; determine that access to the content provider is available; obtain a second response corresponding to the second page of content items from the content provider; and store the second response corresponding to the second page of content items in the local data store, the second response being associated with the second cache key.

In some embodiments, the systems, methods, and non-transitory computer readable media are configured to determine that the second page of content items has not been presented for a threshold period of time and remove the second response corresponding to the second page of content items from the local data store In some embodiments, the systems, methods, and non-transitory computer readable media are configured to determine that the second page of content items is not sequentially connected to any other page of content items stored in the local data store; and remove the second response corresponding to the second page of content items from the local data store.

In some embodiments, the systems, methods, and non-transitory computer readable media are configured to determine one or more actions that were performed by a user operating the computing device while access to the content provider was unavailable; and store the one or more actions in one or more action stores, wherein information describing the actions is provided to the content provider for processing when access to the content provider is restored.

In some embodiments, the actions include one or more of liking a content item, posting a comment, or sharing a content item with another user.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5 illustrates an example method, according to an embodiment of the present disclosure.

Figure 1:
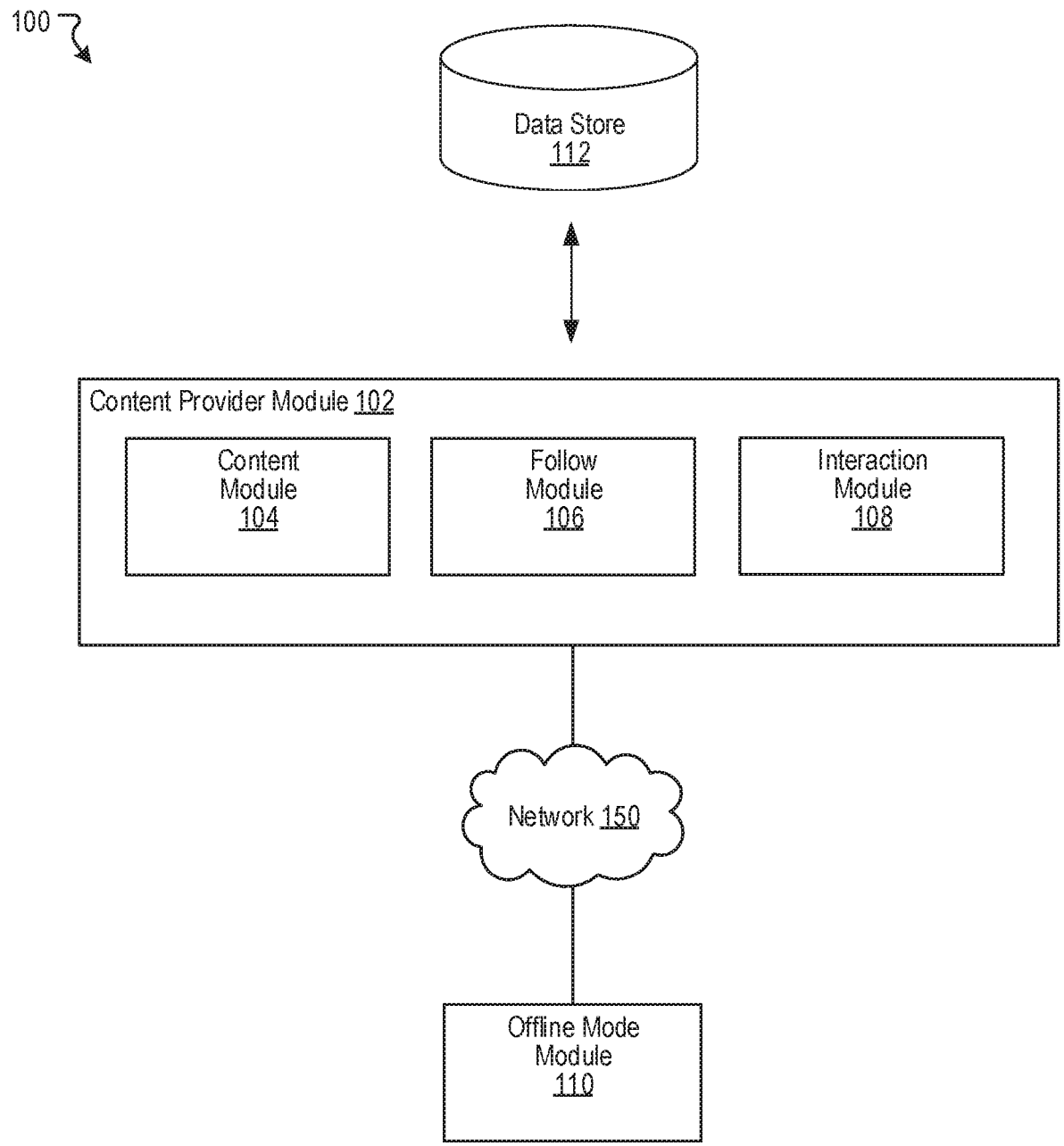
FIG. 1 illustrates an example system including an example content provider module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Accessing Content

People often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, users may post various content items to the social networking system. In general, content items posted by a first user can be included in the respective content feeds of other users of the social networking system that have "followed" the first user. By following (or subscribing to) the first user, some or all content that is produced, or posted, by the first user may be included in the respective content feeds of the users following the first user. A user following the first user can prevent new content from the first user from being included in the user's content feed by simply "unfollowing" the first user.

Under conventional approaches, a user typically interacts with the social networking system through a software application running on a computing device. This software application typically relies on a network connection (e.g., Internet connection) between the computing device and the social networking system. In some instances, such network connections may be interrupted for a number of reasons. In such instances, the software application is generally unable to operate as intended. For example, the user may no longer be able to access content through the software application. In another example, the user may no longer be able to interact with content through the software application (e.g., liking content items, posting comments, sharing content items, etc.). Such restrictions can negatively impact the ways in which users interact with one another in the social networking system. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. For example, a request for a page of content items to be obtained from a content provider can be determined. The request can be associated with a cache key. A determination can be made that access to the content provider is unavailable. A determination can be made that a response corresponding to the page of content items is stored in a local data store based at least in part on the cache key, the response having previously been obtained from the content provider. The page of content items can be presented through a display screen associated with the computing device. More details relating to the disclosed technology are provided below.

FIG. 1 illustrates an example system 100 including an example content provider module 102, according to an embodiment of the present disclosure. As shown in the example of FIG. 1, the content provider module 102 can include a content module 104, a follow module 106, and an interaction module 108. In some instances, the example system 100 can include at least one data store 112. An offline mode module 110 can interact with the content provider module 102 over one or more networks 150 (e.g., the Internet, a local area network, etc.). The offline mode module 110 can be implemented in a software application (e.g., social networking application) running on a computing device. The components (e.g., modules, elements, etc.) shown in this figure and all figures herein are exemplary only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 can be implemented, in part or in whole, as software running on one or more computing devices or systems, such as on a user or client computing device. In one example, the content provider module 102 and/or the offline mode module 110 or at least a portion thereof can be implemented as or within an application (e.g., app), a program, or an applet, etc., running on a user computing device or a client computing system, such as the user device 610 of FIG. 6. In another example, the content provider module 102 or at least a portion thereof can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 630 of FIG. 6.

The content provider module 102 can be configured to communicate and/or operate with the at least one data store 112, as shown in the example system 100. The at least one data store 112 can be configured to store and maintain various types of data. For example, the data store 112 can store information describing various content that has been posted by users of a social networking system. In some implementations, the at least one data store 112 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 112 can store information associated with users, such as user identifiers, user information, profile information, user specified settings, content produced or posted by users, and various other types of user data.

The content module 104 can be configured to provide users with access to content that is posted through a content provider (e.g., social networking system). For example, the content module 104 can provide a first user with access to content items through an interface. This interface may be provided through a display of a computing device being accessed by the first user in which the offline mode module 110 is implemented. The first user can also interact with the interface to post content items to the social networking system. Such content items may include text, images, audio, and videos, for example. For example, the first user can submit a post to be published through the social networking system. In some embodiments, the post can include, or reference, one or more content items. In some embodiments, posts published through the social networking system must include at least one content item.

In various embodiments, other users of the social networking system can access content items posted by the first user. In one example, the other users can access the content items by searching for the first user, for example, by user name through an interface provided by a software application (e.g., a social networking application, browser, etc.) running on their respective computing devices. In some instances, some users may want to see content items posted by the first user in their respective content feed. To cause content items posted by the first user to be included in their respective content feed, a user can select an option through the interface to subscribe to, or "follow", the first user. The follow module 106 can process the user's request by identifying the user as a follower of (or "friend" of) the first user in the social networking system. As a result, some or all content items that are posted by the first user can automatically be included in the respective content feed of the user. If the user decides that they no longer want to see content from the first user in their respective content feed, the user can select an option through the interface to "unfollow" the first user. As a result, the follow module 106 can remove the association between the user and the first user so that content items posted by the first user are no longer included in the content feed of the user.

In some instances, users may want to interact with posted content items. For example, a user may want to endorse, or "like", a content item. In this example, the user can select an option provided in the interface to like the desired content item. The interaction module 108 can determine when a user likes a given content item and can store information describing this relationship. The interaction module 108 can also determine when other forms of user actions are performed and can store information describing the interaction (e.g., information describing the type of interaction, the identity of the user, the identity of the user that posted the content item, and the content item, to name some examples). For example, the user may want to post a comment in response to a content item. In this example, the user can select an option provided in the interface to enter and post the comment for the desired content item. The interaction module 108 can determine when a user posts a comment in response to a given content item and can store information describing this relationship. Other forms of user actions can include reacting to a content item (e.g., selecting an option that corresponds to a particular reaction, e.g., happy, sad, angry, etc.) and sharing a content item, to name some examples. In some embodiments, such information can be stored in a social graph as described in reference to FIG. 6.

In various embodiments, the offline mode module 110 is configured to provide functionality for interacting with the content provider module 102 when network access is interrupted (e.g., network 150 is inaccessible). More details regarding the offline mode module 110 will be provided below with reference to FIG. 2.

Figure 2:
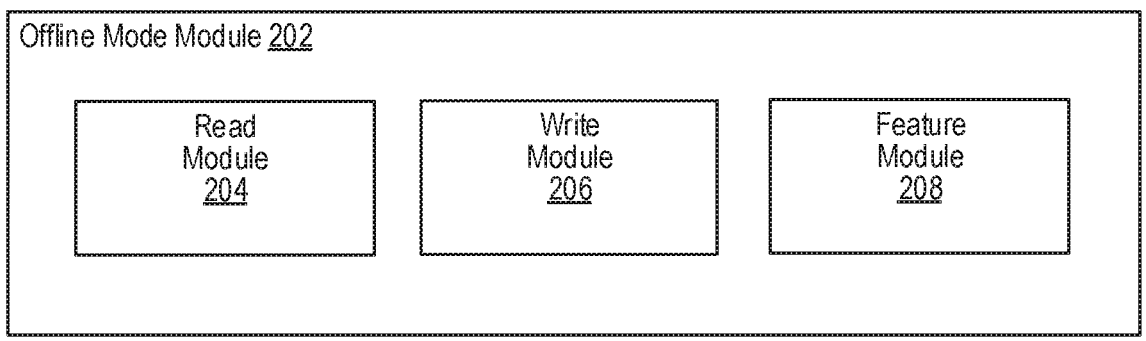
FIG. 2 illustrates an example offline mode module, according to an embodiment of the present disclosure.

FIG. 2 illustrates an offline mode module 202, according to an embodiment of the present disclosure. In some embodiments, the offline mode module 110 of FIG. 1 can be implemented with the offline mode module 202. As shown in the example of FIG. 2, the offline mode module 202 can include a read module 204, a write module 206, and a feature module 208. The offline mode module 202 may be implemented in a software application (e.g., social networking application) running on a computing device.

The read module 204 can be configured to perform various operations to access information (e.g., content) from a content provider (e.g., social networking system). For example, the read module 204 can determine when content is being requested, fetch the content from the content provider over a network connection, and prepare the content for presentation through a display screen of the computing device. In some embodiments, the read module 204 can provide functionality for interacting with the content provider when network access is interrupted. More details regarding the read module 204 will be provided below with reference to FIG. 3A.

The write module 206 can be configured to facilitate user interaction with the content provider. For example, the write module 206 can communicate information describing user interactions to the content provider (e.g., likes, comments, shares, etc.). In some embodiments, the write module 206 can manage user interactions when network access to the content provider is interrupted. More details regarding the write module 206 will be provided below with reference to FIG. 3B.

The feature module 208 can be configured to perform various operations for improving interactions with the content provider, especially when network access to the content provider is unavailable. More details regarding the feature module 208 will be provided below with reference to FIG. 3C.

Figure 3A:
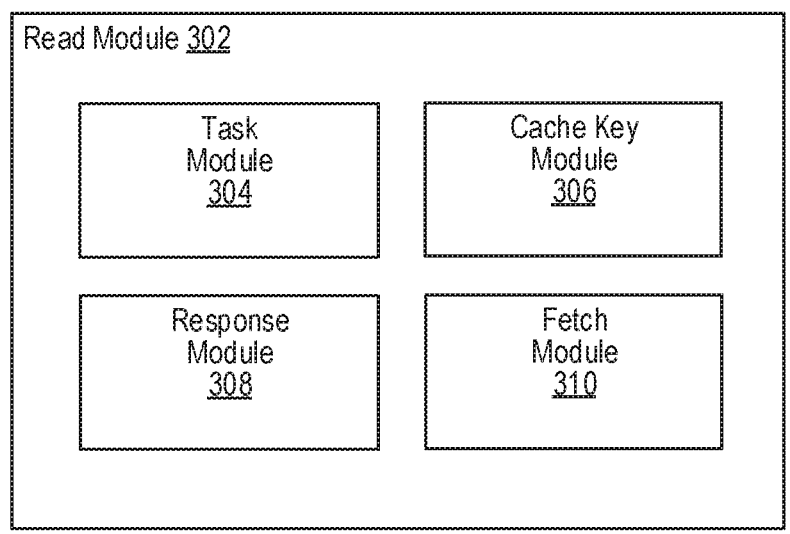
FIG. 3A illustrates an example read module, according to an embodiment of the present disclosure.

FIG. 3A illustrates an example read module 302, according to an embodiment of the present disclosure. In some embodiments, the read module 204 of FIG. 2 can be implemented with the read module 302. As shown in the example of FIG. 3A, the read module 302 can include a task module 304, a cache key module 306, a response module 308, and a fetch module 310.

In various embodiments, the task module 304 can be configured to process requests for accessing information from a content provider (e.g., social networking system). As mentioned, such requests may be initiated when a user operating a computing device interacts with the content provider through a software application (e.g., social networking application) running on the computing device. For example, the task module 304 can automatically send a request for content when the user accesses (or refreshes) the software application. In this example, the task module 304 can send a request to the content provider to obtain a set of content items to be presented through the software application. Once obtained, this set of content items can be processed and presented, as described below. In another example, a request for content can be initiated in response to a user request for a given content item. For example, the software application may provide access to an explore feed in which a number of different content items are presented in a grid interface. The user can then select content items to be viewed from the grid interface. In this example, when a given content item is selected for viewing, the task module 304 can send a request for the content item to the content provider. In some embodiments, requests sent by the task module 304 are HyperText Transfer Protocol (HTTP) requests. An HTTP request can specify information such as the content being requested (e.g., content item identifier, etc.). The content provider can then provide responses to such requests, as described below. In some embodiments, the content provider may provide content items as pages of content items. For example, a given feed (e.g., content feed, explore feed, etc.) may be segmented into a number of different pages and each page can include a pre-defined set of content items. In some embodiments, when requesting content, the task module 304 can specify one or more page numbers with the content request. In response, the content provider can provide information for presenting the requested pages of content items.

In some embodiments, requests sent by the task module 304 can be associated with corresponding cache keys. For example, when a request for content is being prepared, the cache key module 306 can generate a corresponding cache key that identifies the request. In general, a cache key may be created using generally known approaches and may be formatted as an alphanumeric string. For example, a request for a page of content items from a given feed (e.g., content feed, explore feed, etc.) can be associated with a corresponding cache key that can be used to identify the feed and the requested page number. Thus, in such embodiments, each request for the same page of content items from the same feed will be associated with the same cache key. In various embodiments, such cache keys are used to obtain and provide content from a local data store (e.g., asynchronous cache memory) that is accessible to the computing device, as described below in reference to the fetch module 310.

Once a request for content is sent to the content provider, the response module 308 can be configured to receive and process any responses provided by the content provider. In some embodiments, the content provider can process the request for content and can send a response that includes the requested content. The response module 308 can then receive and present the requested content through the computing device. In some embodiments, the content provider processes the request for content and provides an HTTP response. In such embodiments, the HTTP response can provide information for obtaining the requested content. For example, the HTTP response can be a compressed JavaScript Object Notation (JSON) document. In some embodiments, when a page of content items is requested, the JSON document can identify each content item that is included in the requested page, a respective ranking (or ordering) of the content item in the page, and a corresponding Uniform Resource Locator (URL) for accessing the content item. In various embodiments, a cache key that was associated with the request for content is also associated with the HTTP response received from the content provider. The response module 308 can then store the HTTP response (e.g., the compressed JSON document) along with the cache key in the local data store (e.g., asynchronous cache memory) accessible to the computing device.

In various embodiments, the fetch module 310 can be configured to provide access to content when network communication between the computing device and the content provider is severed. For example, the fetch module 310 can determine when a request submitted by the task module 304 fails. Such requests may fail when no responses (e.g., HTTP responses) to the request are received from the content provider, for example, due to loss of network connectivity. In some embodiments, when a failed request is detected, the fetch module 310 identifies a cache key that was associated with the failed request. The fetch module 310 can then search for a response associated with the cache key in the local data store accessible to the computing device. As mentioned, this local data store can be used by the response module 308 to store responses received from the content provider. When a response associated with the cache key is found, the fetch module 310 can provide the response for presentation to the user. In some embodiments, when a response associated with the cache key is not found, the fetch module 310 can determine an alternate stored response to provide for presentation to the user. For example, if the failed request corresponded to page 3 of a given content feed, the fetch module 310 can determine if any other pages of the content feed are stored in the local data store. In this example the fetch module 310 may determine that information corresponding to page 4 of the content feed is stored in the local data store. Here, the fetch module 310 can provide page 4 of the content feed for presentation to the user. More details describing the content request process are provided below in reference to FIGS. 4A-4C.

Figure 3B:
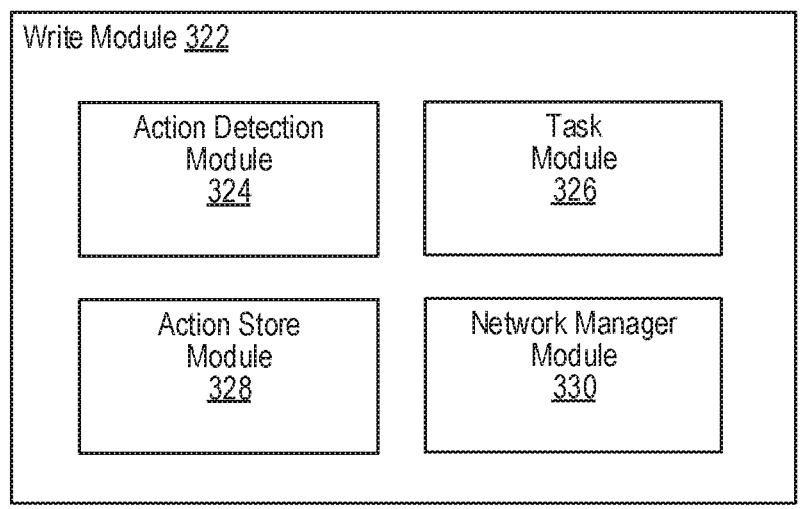
FIG. 3B illustrates an example write module, according to an embodiment of the present disclosure.

FIG. 3B illustrates an example write module 322, according to an embodiment of the present disclosure. In some embodiments, the write module 206 of FIG. 2 can be implemented with the write module 322. As shown in the example of FIG. 3B, the write module 322 can include an action detection module 324, a task module 326, an action store module 328, and a network manager module 330.

In various embodiments, the action detection module 324 can determine user actions that are performed while interacting with a content provider through a software application (e.g., social networking application) running on a computing device. As mentioned, users can perform various actions when interacting with the content provider. Some examples of these actions include liking a content item, posting a comment, sharing a content item with other users, or saving a content item to a local data store that is accessible to the computing device. In some embodiments, when a network connection to the content provider is available, the action detection module 324 provides information describing the detected action(s) to the task module 326. The task module 326 can send an action request to the content provider that includes information describing the detected action(s). The content provider can process such action requests to identify the detected action(s). The content provider can then perform (or execute) the action(s) referenced in the action request. For example, a user action for liking a given content item can be executed by incrementing a like counter associated with the content item. In another example, a user action for posting a comment for a given content item can be executed by causing the comment to be published through the content provider. In yet another example, a user action for sharing (e.g., messaging) a given content item with another user can be executed by causing a message including (or referencing) the given content item to be sent to the other user through the content provider.

In some embodiments, when a network connection to the content provider is not available, the action detection module 324 provides information describing the detected action(s) to the action store module 328 which is configured to store this information. In some embodiments, actions of a given type are stored in separate stores. For example, a pending action store may store information describing user likes (e.g., timestamp of like, content item that was liked, etc.). Other pending action stores may correspond to user comments (e.g., timestamp of comment, content item for which the comment was posted, comment text, etc.) and user shares (e.g., content item shared, user(s) with whom the content item was shared, etc.), to name some examples.

In some embodiments, the network manager module 330 is configured to determine when network access to the content provider is available. For example, the network manager module 330 may be configured to poll the content provider at various time intervals to determine whether network access to the content provider is available. As mentioned, there may be instances in which such network access is not available. In such instances, actions performed by the user typically cannot be communicated to the content provider. In some embodiments, when network access is not available, information describing user actions is stored by the action store module 328, as described above. When the network manager module 330 determines that network access to the content provider is available, the network manager module 330 can instruct the action store module 328 to provide information describing the stored action(s) to the content provider. In some embodiments, the action store module 328 sends this information to the task module 326. The task module 326 can generate an action request which includes information describing the stored action(s). The task module 326 can then send the action request to the content provider for processing, as described above.

Figure 3C:
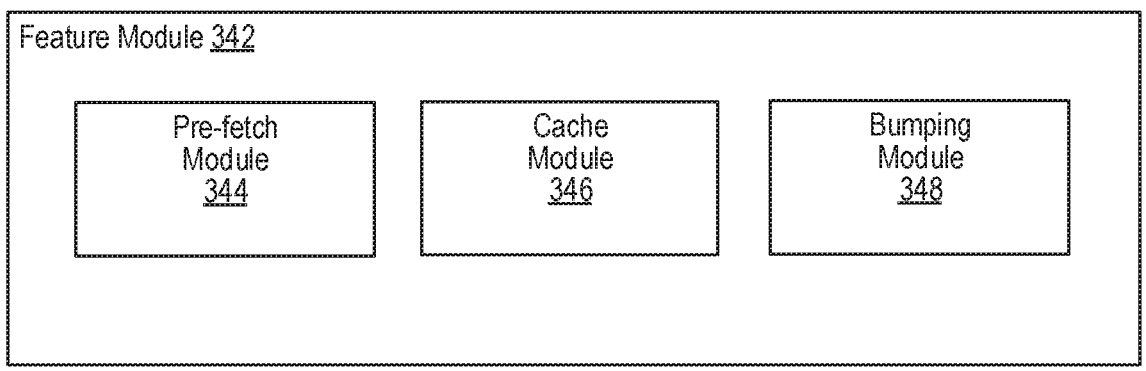
FIG. 3C illustrates an example feature module, according to an embodiment of the present disclosure.

FIG. 3C illustrates an example feature module 342, according to an embodiment of the present disclosure. In some embodiments, the feature module 208 of FIG. 2 can be implemented with the feature module 342. As shown in the example of FIG. 3C, the feature module 342 can include a pre-fetch module 344, a cache module 346, and a bumping module 348.

In some embodiments, the pre-fetch module 344 can be configured to pre-fetch various content from a content provider prior to any user requests being submitted for the content. Such pre-fetching may be performed as a background process, for example, while a user is interacting with the content provider using a software application (e.g., social networking application) running on a computing device. The pre-fetched content can be stored in a local data store accessible to the computing device for retrieval and presentation at a later time. For example, pre-fetched content can be retrieved and presented when network access to the content provider is interrupted.

In some embodiments, content pre-fetching is activated whenever a network connection to the content provider is available. In such embodiments, any content obtained from the content provider is associated with a corresponding cache key and stored in the local data store, as described above. In some embodiments, the pre-fetch module 344 can be configured to pre-fetch content more or less aggressively depending on the type of network connection that is available. For example, the pre-fetch module 344 can pre-fetch larger amounts of content when accessing a threshold low latency network connection (e.g., Wi-Fi) and smaller amounts of content when accessing a threshold high latency network connection (e.g., cellular). Similarly, the pre-fetch module 344 can pre-fetch content at various time intervals depending on the network connection. For example, the pre-fetch module 344 can pre-fetch content at shorter time intervals when accessing a threshold low latency network connection and at longer time intervals when accessing a threshold high latency network connection. In various embodiments, users can define their pre-fetching preferences to indicate when (e.g., times of day) and/or where (e.g., when at home, work, on a free public network, etc.) pre-fetching is or is not permitted.

In some embodiments, the pre-fetch module 344 can be configured to pre-fetch and cache offline advertisements ("ads") using the approaches described herein. In such embodiments, the offline ads can be stored in the local data store and presented when a network connection to the content provider is not available. In some embodiments, offline ads are associated with content items based on a contextual relationship. In such embodiments, an offline ad that is associated with a given content item can be presented when the content item is displayed through the software application (e.g., social networking application).

In some embodiments, the cache module 346 can be configured to improve content caching. In some embodiments, the cache module 346 caches content items based on user behavior. For example, the cache module 346 can cache content that is frequently accessed by a given user. Such caching can involve caching certain types of content items that correspond to a frequently accessed category, content items posted by a certain user being followed, content items of a certain media type (e.g., images, videos, etc.), to name some examples.

In some embodiments, the cache module 346 can be configured to flush cached content items (or pages of content items) stored in the local data store. In some embodiments, the cache module 346 flushes stale content items that have not been presented for some threshold period of time. In some embodiments, the cache module 346 is configured to maintain a threshold number of pages of content items. In such embodiments, once the threshold number of pages have been cached, the cache module 346 flushes the oldest page of content items from the local data store. In another example, once the threshold number of pages have been cached, the cache module 346 can flush the least recently used content item (or page of content items).

In some embodiments, the cache module 346 periodically flushes unconnectable pages of content items. In some embodiments, an unconnectable page is a page of content items that cannot sequentially be linked to another page of content items stored in the local data store. For example, the local data store may cache information corresponding to pages 1, 2, 3, 9, 10, and 16 of a given content feed. Here, the cache module 346 can determine that pages 1, 2, and 3 are connectable to one another and that pages 9 and 10 are also connectable to one another. In this example, the cache module 346 can flush page 16 from the local data store upon determining that page 16 cannot be linked sequentially to any of pages 1, 2, 3, 9, or 10. In some embodiments, the cache module 346 can flush all pages of content items corresponding to a given content feed stored from the local data store when the content feed is accessed and refreshed through the software application (e.g., social networking application).

In some embodiments, the bumping module 348 can be configured to generate one or more pages of unseen content items. These pages of unseen content items may be generated from pages of content items stored in the local data store. For example, in some embodiments, the bumping module 348 can evaluate any pages of content items that are stored in the local data store to identify content items that have not been presented to (or accessed by) a given user. In such embodiments, the bumping module 348 can generate a page using the unseen content items. This page of unseen content items can be presented to the user when a network connection to the content provider is not available, for example.

Figure 4A:
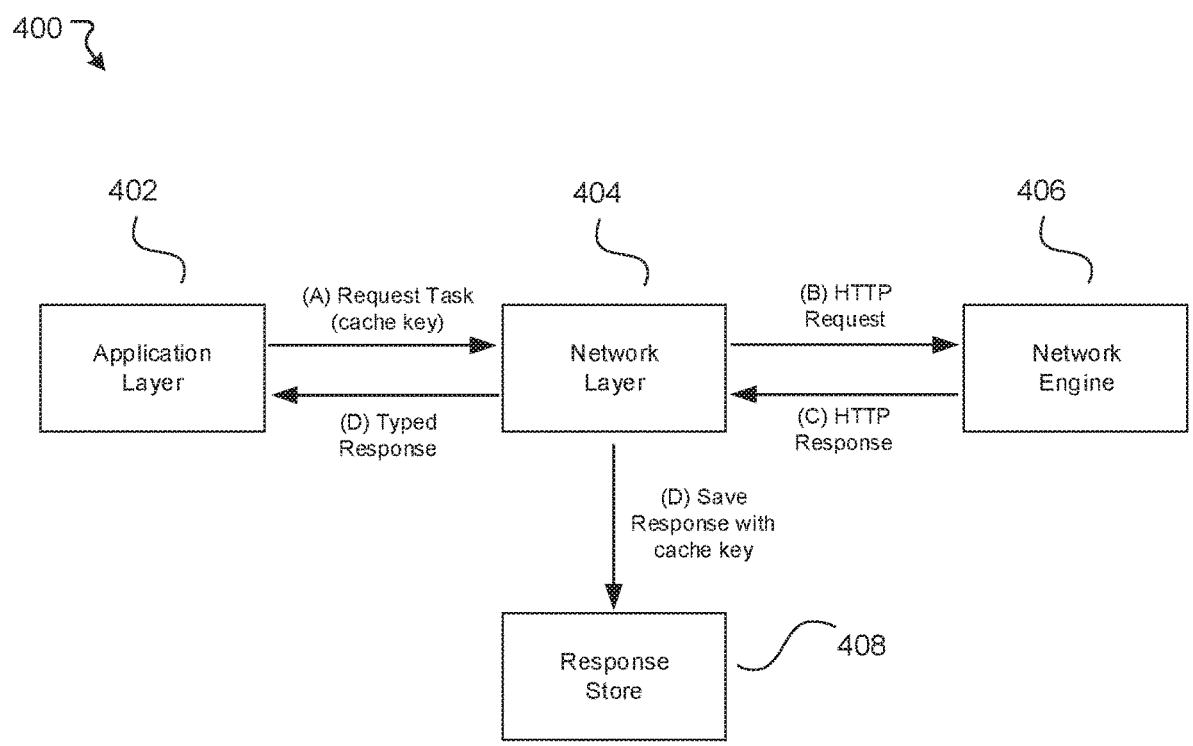
FIGS. 4A-4C illustrate example diagrams, according to an embodiment of the present disclosure.

FIG. 4A illustrates an example diagram 400, according to an embodiment of the present disclosure. The diagram 400 illustrates an example workflow for accessing content through a content provider. The diagram 400 includes an application layer 402, a network layer 404, and a network engine 406, each of which may be implemented in a read module (e.g., the read module 302 of FIG. 3A). The diagram 400 also includes a response store 408 in which information can be stored. The response store 408 may be a local data store (e.g., asynchronous cache memory) that is accessible to a computing device in which the read module is implemented. In this example workflow, the application layer 402 can submit a request to the network layer 404 at state (A). This request may be a request for accessing content from the content provider. As mentioned, such requests may be submitted automatically to obtain new content or may be submitted in response to user actions. For example, the request may be for a given page of content items corresponding to a feed (e.g., content feed, explore feed, etc.). In some embodiments, the request is associated with a unique cache key. For example, the request can be associated with a corresponding cache key that references the feed and the requested page of content items. The network layer 404 can generate an HTTP request that corresponds to the request sent by the application layer 402. At state (B), the network layer 404 can provide the HTTP request to the network engine 406 which is configured to send the HTTP request to the content provider over a network. At state (C), the network engine 406 can receive any responses provided by the content provider and provide the responses to the network layer 404. For example, the network engine 406 can receive an HTTP response sent by the content provider. In some embodiments, the HTTP response can provide information for accessing the requested content. For example, the HTTP response can be a compressed JavaScript Object Notation (JSON) document. This HTTP response can be provided to the network layer 404 for processing. For example, the network layer 404 can decompress the HTTP response to access the JSON document. The network layer 404 can also generate a formatted response (e.g., typed response) using the information provided in the JSON document. For example, the network layer 404 can obtain content items referenced in the JSON document by accessing their respective URLs over the network. The network layer 404 can then prepare the formatted response which includes copies of the content items and information describing those content items (e.g., a respective text description provided by an author of the content item, likes received for the content item, comments received for the content item, etc.). This formatted response can then be provided to the application layer 402 for presentation at state (D). In some embodiments, at state (D), the response (e.g., HTTP response, formatted response, or both) can be stored in the response store 408 (e.g., the local data store) along with the cache key associated with the request. In some embodiments, this cache key can be used to obtain and provide the stored response from the response store 408 when a network connection to the content provider is not available, as described in reference to FIG. 4B.

Figure 4B:
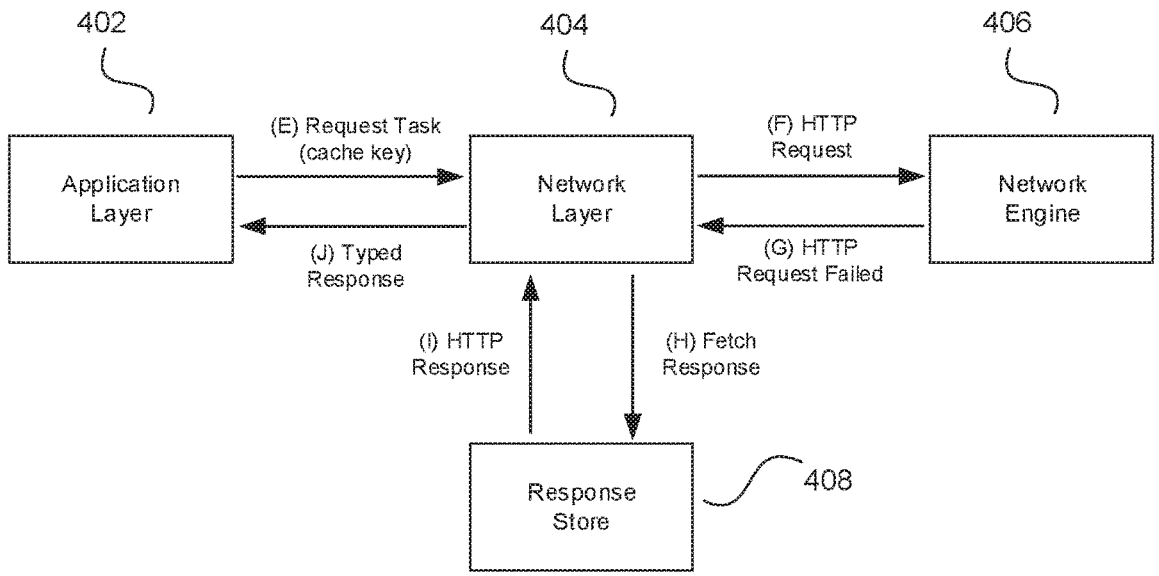

As shown in the example of FIG. 4B, the application layer 402 can submit a request to the network layer 404 at state (E). In this example, the request being sent at state (E) matches the request that was sent by the application layer 402 in state (A). The request being sent at state (E) can be associated with a unique cache key. In this example, since the request being sent at state (E) matches the request that was sent at state (A), the request in state (E) is associated with the same cache key as the one associated with the request in state (A). The network layer 404 can generate an HTTP request that corresponds to the request sent by the application layer 402 in state (E). At state (F), the network layer 404 can provide the HTTP request to the network engine 406 which is configured to send the HTTP request to the content provider over a network. The network engine 406 can receive any responses provided by the content provider. In this example, since a network connection to the content provider is not available, the network engine 406 can determine that the HTTP request has failed. At state (G), the network engine 406 can provide a response to the network layer 404 indicating the HTTP request has failed. In some embodiments, the network layer 404 can obtain a response for the request from the response store 408. For example, the network layer 404 can determine the cache key that was associated with the request sent to the network engine in state (F). At state (H), the network layer 404 can request a response associated with the cache key from the response store 408. In this example, the response was stored by the response store 408 in state (D), as described above. Thus, at state (I), the response store 408 provides a copy of the stored response to the network layer 404. The network layer 404 can then prepare a formatted response based on information provided in this response, as described above. At state (J), this formatted response can then be provided to the application layer 402 for presentation through the computing device.

Figure 4C:
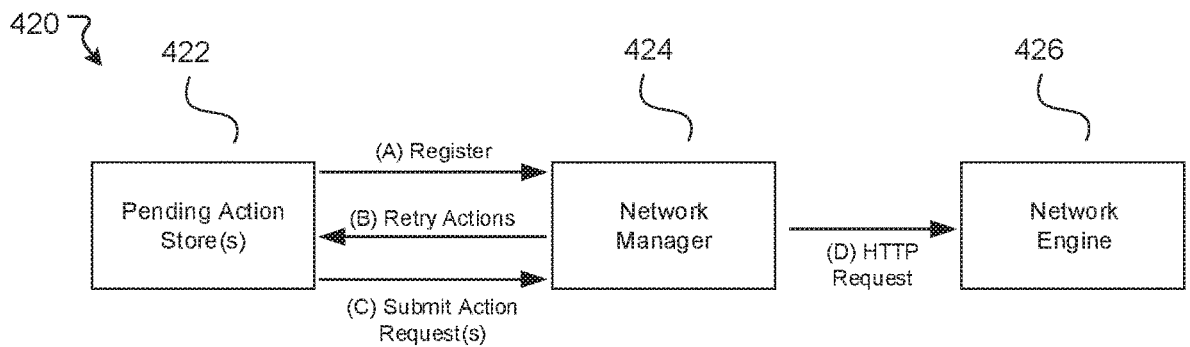

FIG. 4C illustrates an example diagram 420, according to an embodiment of the present disclosure. The diagram 420 illustrates an example workflow for managing user actions that are performed when network access to the content provider is not available. The diagram 420 includes one or more pending action stores 422, a network manager 424, and a network engine 426, each of which may be implemented in a write module (e.g., the write module 322 of FIG. 3B). In this example workflow, each of the pending action stores 422 can register with the network manager 424 at state (A). This registration process informs the network manager 424 of the different pending action stores 422 that exist. In some embodiments, a separate pending action store may be managed for each type of action that can be performed by users. For example, a pending action store may store information describing user likes (e.g., timestamp of like, content item that was liked, etc.). Other pending action stores may correspond to user comments (e.g., timestamp of comment, content item for which the comment was posted, comment text, etc.) and user shares (e.g., content item shared, user(s) with whom the content item is being shared, etc.), to name some examples. The network manager 424 can determine whether network access to the content provider is available. When a network connection with the content provider is established, at state (B), the network manager 424 instructs the pending action stores 422 to provide information describing the user actions that were performed while access to the content provider was not available. Each of the pending action stores 422 can determine a respective list of pending user actions that need to be submitted to the content provider for processing. At state (C), the pending actions stores 422 can provide a respective action request to the network manager 424. In some embodiments, an action request includes information describing a list of pending actions that were performed by the user while network access to the content provider was unavailable. At state (D), the network manager 424 can provide the action request(s) to the network engine 426 which is configured to send the action request(s) to the content provider for processing.

FIG. 5 illustrates an example method 500, according to an embodiment of the present disclosure. It should be appreciated that there can be additional, fewer, or alternative steps performed in similar or alternative orders, or in parallel, within the scope of the various embodiments discussed herein unless otherwise stated.

At block 502, a request for a page of content items to be obtained from a content provider can be determined. The request can be associated with a cache key. At block 504, a determination can be made that access to the content provider is unavailable. At block 506, a determination can be made that a response corresponding to the page of content items is stored in a local data store based at least in part on the cache key, the response having previously been obtained from the content provider. At block 508, the page of content items can be presented through a display screen associated with a computing device.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
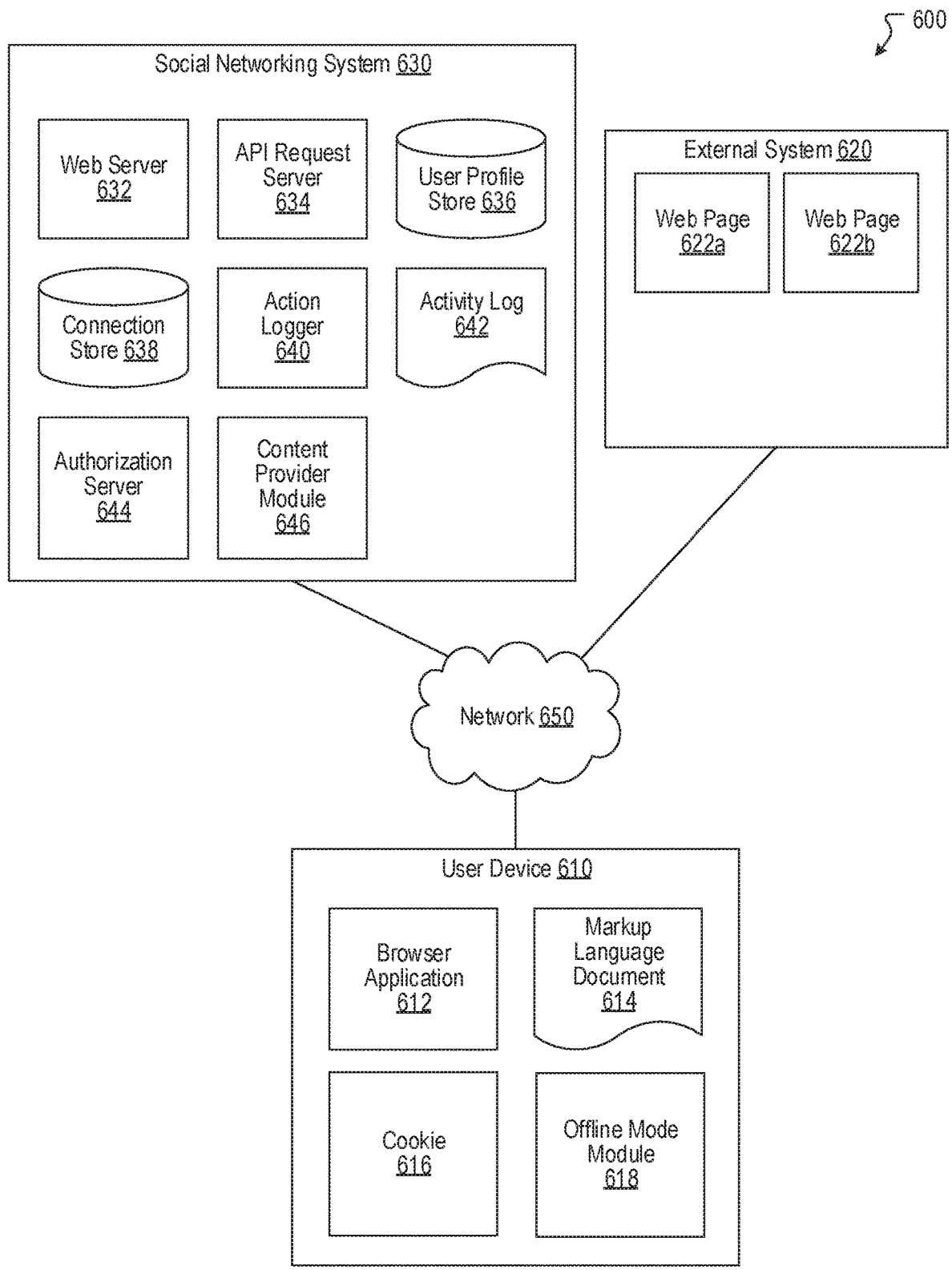
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102 of FIG. 1. In some embodiments, the content provider module 646, in whole or in part, is also implemented in the user device 610. In some embodiments, the user device 610 can include an offline mode module 618. The offline mode module 618 can, for example, be implemented as the offline mode module 110 of FIG. 1. In some embodiments, the offline mode module 618, in whole or in part, is also implemented in the social networking system 630. As discussed previously, it should be appreciated that there can be many variations or other possibilities.

Hardware Implementation

Figure 7:
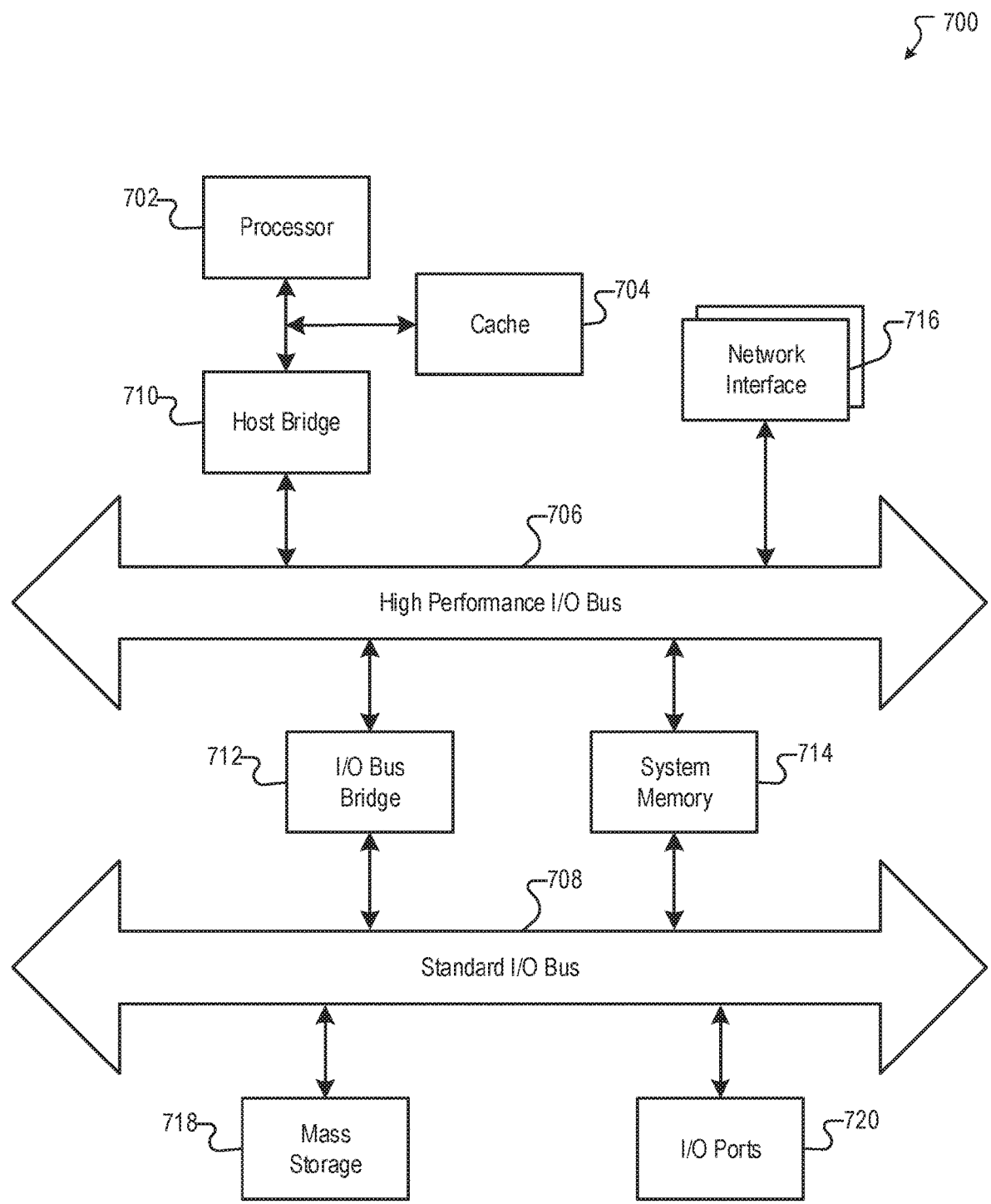
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing device, a request for a page of content items to be obtained from a content provider, the request being associated with a cache key, wherein the cache key references at least the page of content items and a corresponding feed for the page of content items, wherein the corresponding feed is segmented into a plurality of pages including the page;
   determining, by the computing device, that access to the content provider is unavailable;
   determining, by the computing device, that a response corresponding to the page of content items and associated with the cache key is stored in a local data store based at least in part on the cache key, wherein the response was previously obtained from the content provider; and
   presenting, by the computing device, the page of content items through a display screen associated with the computing device.

2. The computer-implemented method of claim 1, wherein the response stored in the local data store is also associated with the cache key.

3. The computer-implemented method of claim 1, wherein the stored response includes a JavaScript Object Notation (JSON) document that identifies each content item included in the page.

4. The computer-implemented method of claim 3, wherein the response indicates a respective ranking for each content item in the page.

5. The computer-implemented method of claim 1, the method further comprising:
   determining, by the computing device, a second request for a second page of content items to be obtained from the content provider, the request being associated with a second cache key;
   determining, by the computing device, that access to the content provider is available;
   obtaining, by the computing device, a second response corresponding to the second page of content items from the content provider; and
   storing, by the computing device, the second response corresponding to the second page of content items in the local data store, the second response being associated with the second cache key.

6. The computer-implemented method of claim 5, the method further comprising:
   determining, by the computing device, that the second page of content items has not been presented for a threshold period of time; and
   removing, by the computing device, the second response corresponding to the second page of content items from the local data store.

7. The computer-implemented method of claim 5, the method further comprising:
   determining, by the computing device, that the second page of content items is not sequentially connected to any other page of content items stored in the local data store; and
   removing, by the computing device, the second response corresponding to the second page of content items from the local data store.

8. The computer-implemented method of claim 1, the method further comprising:
   determining, by the computing device, one or more actions that were performed by a user operating the computing device while access to the content provider was unavailable; and
   storing, by the computing device, the one or more actions in one or more action stores, wherein information describing the actions is provided to the content provider for processing when access to the content provider is restored.

9. The computer-implemented method of claim 8, wherein the actions include one or more of liking a content item, posting a comment, or sharing a content item with another user.

10. A system comprising:
    at least one processor; and
    a memory storing instructions that, when executed by the at least one processor, cause the system to perform:
        determining a request for a page of content items to be obtained from a content provider, the request being associated with a cache key, wherein the cache key references at least the page of content items and a corresponding feed for the page of content items, wherein the corresponding feed is segmented into a plurality of pages including the page;
        determining that access to the content provider is unavailable;
        determining that a response corresponding to the page of content items and associated with the cache key is stored in a local data store based at least in part on the cache key, wherein the response was previously obtained from the content provider; and
        presenting the page of content items through a display screen associated with the system.

11. The system of claim 10, wherein the response stored in the local data store is also associated with the cache key.

12. The system of claim 10, wherein the stored response includes a JavaScript Object Notation (JSON) document that identifies each content item included in the page.

13. The system of claim 12, wherein the response indicates a respective ranking for each content item in the page.

14. A non-transitory computer-readable storage medium including instructions that, when executed by at least one processor of a computing device, cause the computing device to perform a method comprising:
    determining a request for a page of content items to be obtained from a content provider, the request being associated with a cache key, wherein the cache key references at least the page of content items and a corresponding feed for the page of content items, wherein the corresponding feed is segmented into a plurality of pages including the page;

determining that access to the content provider is unavailable;

determining that a response corresponding to the page of content items and associated with the cache key is stored in a local data store based at least in part on the cache key, wherein the response was previously obtained from the content provider; and presenting the page of content items through a display screen associated with the computing device.

15. The non-transitory computer-readable storage medium of claim 14, wherein the response stored in the local data store is also associated with the cache key.

16. The non-transitory computer-readable storage medium of claim 14, wherein the stored response includes a JavaScript Object Notation (JSON) document that identifies each content item included in the page.

17. The non-transitory computer-readable storage medium of claim 16, wherein the response indicates a respective ranking for each content item in the page.

\* \* \* \* \*